United States Patent
Zobel, Jr. et al.

[11] Patent Number: 6,128,130
[45] Date of Patent: Oct. 3, 2000

[54] VISUALLY SEAMLESS PROJECTION SCREEN AND METHODS OF MAKING SAME

[75] Inventors: Richard W. Zobel, Jr., Raleigh; Joseph Gerard Fitzpatrick, Bullock, both of N.C.

[73] Assignee: Alternate Realities Corporation, Morrisville, N.C.

[21] Appl. No.: 08/928,932

[22] Filed: Sep. 12, 1997

[51] Int. Cl.[7] .................................................. G03B 21/56
[52] U.S. Cl. ........................ 359/443; 359/449; 359/451
[58] Field of Search .................................. 359/451, 443, 359/450, 461, 449, 460

[56] References Cited

U.S. PATENT DOCUMENTS

| | | | |
|---|---|---|---|
| 2,366,761 | 1/1945 | Walker | 359/460 |
| 2,592,444 | 4/1952 | Matelena | 88/24 |
| 2,753,818 | 7/1956 | Green | 359/443 |
| 2,883,763 | 4/1959 | Schaper | 35/12 |
| 2,999,322 | 9/1961 | Hemstreet | 35/12 |
| 3,655,203 | 4/1972 | Gretzky | 350/125 |
| 3,695,751 | 10/1972 | Watanuki | 352/70 |
| 3,720,455 | 3/1973 | Sahlin | 350/117 |
| 3,846,011 | 11/1974 | Stein | 350/117 |
| 3,902,787 | 9/1975 | Sherlock | 350/127 |
| 3,998,522 | 12/1976 | Holzel | 350/125 |
| 4,022,522 | 5/1977 | Rain | 350/117 |
| 4,057,323 | 11/1977 | Ward, Jr. | 350/125 |
| 4,323,301 | 4/1982 | Spector | 350/117 |
| 4,339,175 | 7/1982 | Asterö | 350/125 |
| 4,372,071 | 2/1983 | Vicino | 40/624 |
| 4,473,355 | 9/1984 | Pongratz | 434/44 |
| 4,500,163 | 2/1985 | Burns et al. | 350/3.7 |
| 4,514,347 | 4/1985 | Reed | 264/32 |
| 4,597,633 | 7/1986 | Fussell | 350/125 |
| 4,739,568 | 4/1988 | Gearhart | 40/603 |
| 4,750,808 | 6/1988 | Nash et al. | 350/125 |
| 4,895,429 | 1/1990 | Iwahara et al. | 350/124 |
| 5,011,263 | 4/1991 | Hopper | 350/125 |
| 5,098,616 | 3/1992 | King et al. | 264/1.9 |
| 5,127,722 | 7/1992 | Nishitani | 359/443 |
| 5,130,846 | 7/1992 | Kowalchuk | 359/443 |
| 5,137,348 | 8/1992 | Lacroix | 353/79 |
| 5,179,440 | 1/1993 | Loban et al. | 358/87 |
| 5,253,116 | 10/1993 | Lacroix | 359/858 |
| 5,502,481 | 3/1996 | Dentinger et al. | 348/51 |
| 5,724,775 | 3/1998 | Zobel, Jr. et al. | 52/82 |

FOREIGN PATENT DOCUMENTS

| | | |
|---|---|---|
| 2706661 | of 0000 | France . |
| 2706662 | of 0000 | France . |
| 32224953C2 | of 0000 | Germany . |
| 4442378A1 | of 0000 | Germany . |
| 137387 | of 0000 | Japan . |
| 171344 | of 0000 | Japan . |
| 2140166A | of 0000 | United Kingdom . |

*Primary Examiner*—Safet Metjahic
*Assistant Examiner*—Christopher Mahoney
*Attorney, Agent, or Firm*—Myers Bigel Sibley & Sajovec, P.A.

[57] ABSTRACT

A projection screen is formed from a plurality of translucent fabric panels joined along overlapping peripheral edge portions to produce a reflective, curved front screen surface. Overlapping peripheral edge portions extend outwardly from the back surface of the screen and are configured to be substantially less reflective than the front or projection surface of the screen. Accordingly, the visibility of seams between adjacent fabric panels to a viewer viewing images projected onto the screen is diminished.

13 Claims, 4 Drawing Sheets

VISUALLY SEAMLESS PROJECTION SCREEN AND METHODS OF MAKING SAME

FIELD OF THE INVENTION

The present invention relates generally to projection screens and more particularly to fabric projection screens.

BACKGROUND OF THE INVENTION

Hemispherical optical projection systems are used to project images onto the inner surfaces of domes. Hemispherical optical projection systems are used in planetariums, commercial and military flight simulators, and in various hemispherical theaters. With the present interest in virtual reality and three-dimensional rendering of images, hemispherical optical projection systems are being investigated for projecting images which simulate a real environment.

It is desirable that curved projection screens used with hemispherical optical projection systems have a smooth, continuous surface upon which images are projected. Reflective fabric may be used for curved projection screens because it is lightweight and relatively easy to form into a curved shape using multiple panels joined together. Typically, panels of fabric are sewn together along adjacent edge portions to create the desired curved shape. Unfortunately, the seam created when adjacent panels of fabric are joined together is often visible to viewers when images are projected onto the screen. For a hemispherical screen, the seams between multiple fabric panels may produce an unwanted grid-like pattern, much like the lines of latitude or longitude on a globe. These lines are often distracting when viewing images projected onto the screen.

SUMMARY OF THE INVENTION

It is therefore an object of the present invention to provide a curved, multiple-panel fabric projection screen wherein the visibility of seams between adjacent panels of fabric is diminished when images are projected on the screen.

This and other objects of the present invention are provided by a projection screen formed from a plurality of translucent fabric panels, the overlapping peripheral edge portions of which are substantially less reflective than the projection surface of the screen. More specifically, the fabric panels are joined along overlapping peripheral edge portions to produce a reflective projection surface having a concave shape. Seams are visible between adjacent fabric panels when images are not projected onto the screen. The overlapping peripheral edge portions extend outwardly from the back surface of the screen and are configured to be substantially less reflective than the projection surface of the screen.

By configuring the overlapping peripheral edge portions to be substantially less reflective than the projection surface, the visibility of the seams to a viewer viewing images projected onto the screen is diminished. The overlapping peripheral edge portions may have a dark material secured thereto, such as black tape, that is substantially less reflective than the projection surface. Alternatively, the peripheral edge portions may be colored with a dark color that is substantially less reflective than the screen front surface.

The projection screen may have various concave configurations and may be specifically designed for use with a hemispherical optical projection system. A frame, having an annular base and a plurality of arcuate ribs extending therefrom and converging at a location thereabove, is enclosed by an outer and inner fabric layer secured along the annular base of the frame. The outer fabric layer overlies the outer portion of the frame and the inner fabric layer is configured to conform to the concave shape of the frame. The inner fabric layer serves as the projection screen for the hemispherical projection system. By creating a vacuum between the inner and outer fabric layers, the inner fabric layer is drawn taut with the frame to provide a concave viewing surface. A fan is typically used for creating a vacuum within the envelope.

The present invention is advantageous because the visibility of seams between adjacent fabric panels is diminished when images are projected onto the screen. By eliminating the appearance of distracting seams, a viewer's attention remains with the projected images and not with the screen. Accordingly, an enhanced environment can be presented to viewers, particularly when virtual reality and other three dimensional images are involved.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
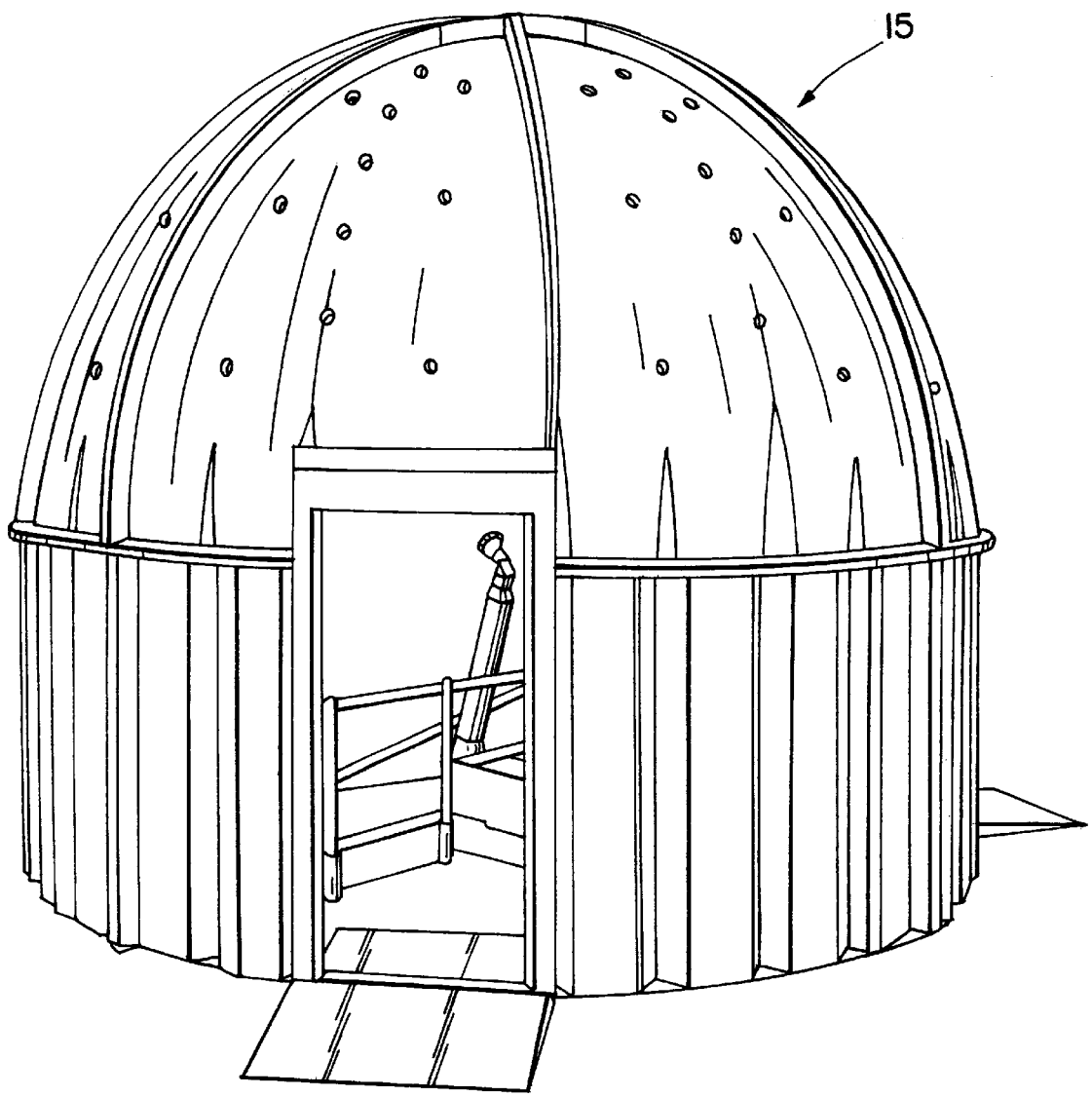
FIG. 1 illustrates a dome structure in which a fabric projection screen incorporating aspects of the present invention may be housed.

Referring now to FIG. 1, an exemplary dome structure 15 for housing a hemispherical optical projection system and fabric screen, according to aspects of the present invention, is illustrated. The dome structure 15 is preferably constructed for portability and ease of assembly and disassembly. A preferred construction for the dome structure 15 is described in copending application Ser. No. 08/593,041 to Zobel et al., filed Jan. 29, 1996, entitled "Multi-Pieced, Portable Projection Dome and Method of Assembling the Same" and assigned to the assignee of the present application, the disclosure of which is incorporated herein by reference in its entirety. However, it is to be understood that a fabric projection screen incorporating aspects of the present invention may be housed within a variety of structures and/or may have various shapes and sizes.

Figure 2:
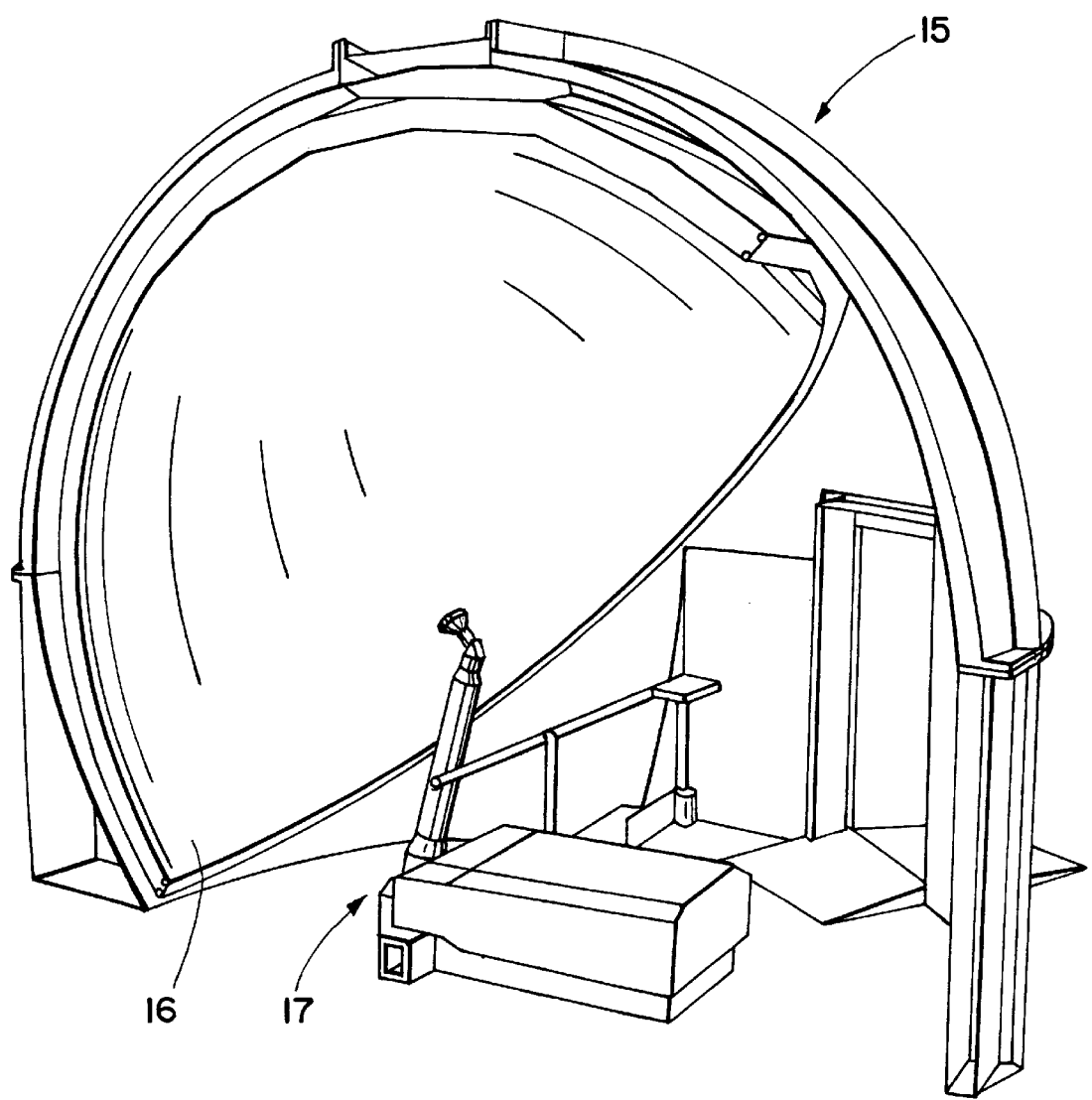
FIG. 2 illustrates a hemispherical optical projection system contained within the dome structure of FIG. 1.

Referring now to FIG. 2, the illustrated dome structure 15 houses a hemispherical projection screen 16 (shown in cut-away view for clarity) configured to receive focused images projected thereon by a hemispherical optical projection system 17. Exemplary hemispherical optical projection systems are described in copending application Ser. No. 08/593,699 to Colucci et al., filed Jan. 29, 1996, entitled "Tiltable Hemispherical Optical Projection Systems and Methods Having Constant Angular Separation of Projected Pixels" and copending application Ser. No. 08/760,593 to Colucci, filed Dec. 3, 1996, entitled "Optical Projection Systems and Methods Having an Image Relay Adapter", which are assigned to the assignee of the present application, the disclosures of which are incorporated herein by reference in their entirety. The hemispherical optical projection system 17 is typically located at a central location within the dome structure 15, as illustrated.

Figure 3A:
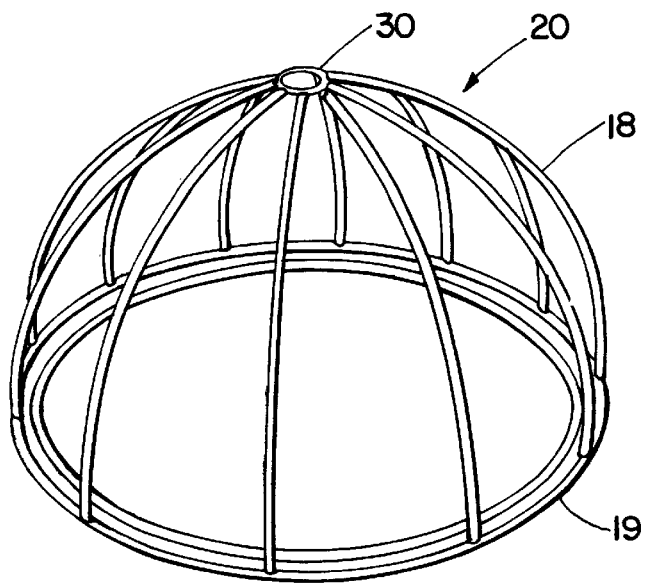
FIGS. 3A–3C illustrate a hemispherical projection screen and frame that may incorporate aspects of the present invention.

Referring now to FIG. 3A, a supporting structure for the hemispherical screen illustrated in FIG. 2 is shown. Multiple arcuate ribs or members 18 extend upwardly from an annular base 19 and converge to form a hemispherical frame 20 of a desired shape and size for supporting flexible material to be used as a projection screen. The frame 20 is preferably secured within a dome 15 at an angle, as shown in FIG. 2, although for planetarium-type projection it may be secured parallel to the base. However, a projection screen incorporating aspects of the present invention may be free-standing, and does not require a dome or other housing.

Figure 3B:
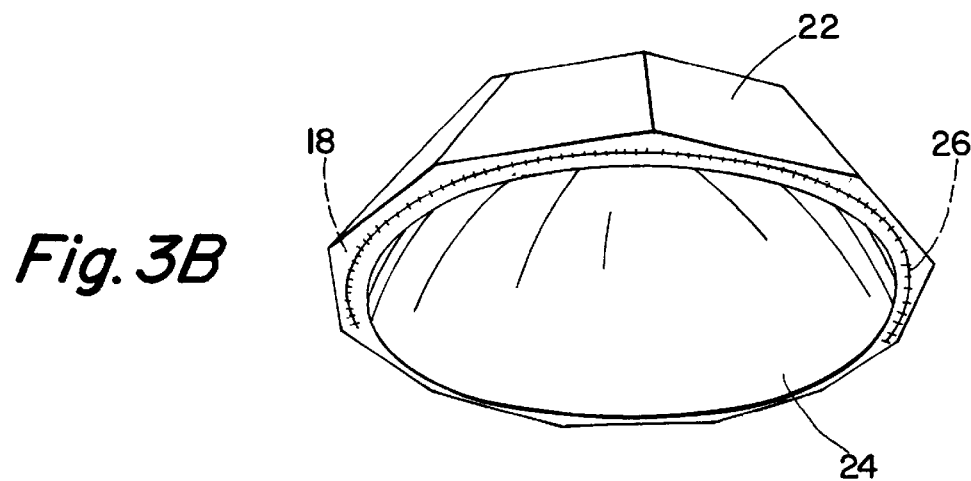
Figure 3C:
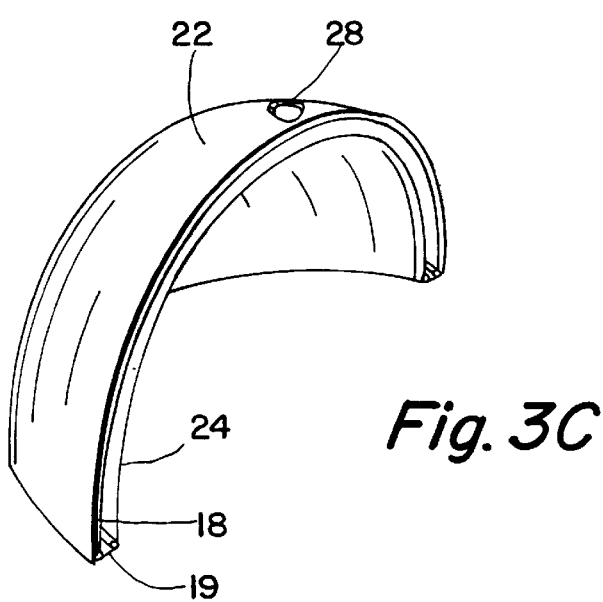

Referring now to FIGS. 3B and 3C, an outer layer of flexible material 22 is physically supported by the frame 18. An inner layer of flexible material 24 is attached to the outer layer 22 along a bottom portion 26 of the supporting frame 18. Preferably the outer and inner layers 22 and 24 are removably secured to each other along the bottom portion 26 of the supporting frame. In the illustrated embodiment, a zipper 27 removably secures the outer and inner layers 22, 24 together. An overlying flap of material (not shown) may hide the zipper 27 from view. It is preferred that the zipper 27 or other means for removably securing the inner and outer layers together be designed to keep the ingress of air therethrough at a low level.

A fan (not shown), or other source of vacuum, is preferably located near the upper portion 30 of the frame 18, and is configured to evacuate air from between the outer and inner layers of flexible material 22 and 24. When the fan is activated, a vacuum is created between the outer and inner layers 22 and 24 thereby causing the inner layer 24 to be pulled taut and held into place against the annular base 19 of the supporting frame 18 to provide a smooth, continuous projection surface 25, as illustrated in FIG. 3B. When a vacuum is created between the outer and inner layers of flexible material 22 and 24, the supporting frame 18 prevents the outer layer 22 from contacting the inner layer to assure no physical obstruction to the shaping of the screen.

As illustrated in FIG. 3C, which is a cut-away view of the hemispherical screen illustrated in FIG. 3B, the frame 18 keeps the outer and inner fabric layers 22, 24 separated from each other. Air is evacuated from between the outer and inner layers through an aperture 28 in the outer layer 22. However, air may be evacuated from between the outer and inner layers 22 and 24 via one or more apertures at various locations in the outer layer.

Preferably, the flexible material used to form the outer and inner layers 22 and 24 is a fabric that is substantially impervious to air. However, any type of material can be used if the leakage or flow of air though the outer and inner layers 22 and 24, or though the location where they are attached, is at a rate less than can be drawn out by the fan 28. The connection of the outer and inner layers 22 and 24 preferably provides a substantially airtight seal to facilitate creating a vacuum between the respective layers. The outer and inner layers 22 and 24 are preferably formed from a semi-translucent fabric, such as nylon. A preferred fabric color is a flat white with an optical coating or surface treatment which allows for a gain approaching 1.0.

Figure 4:
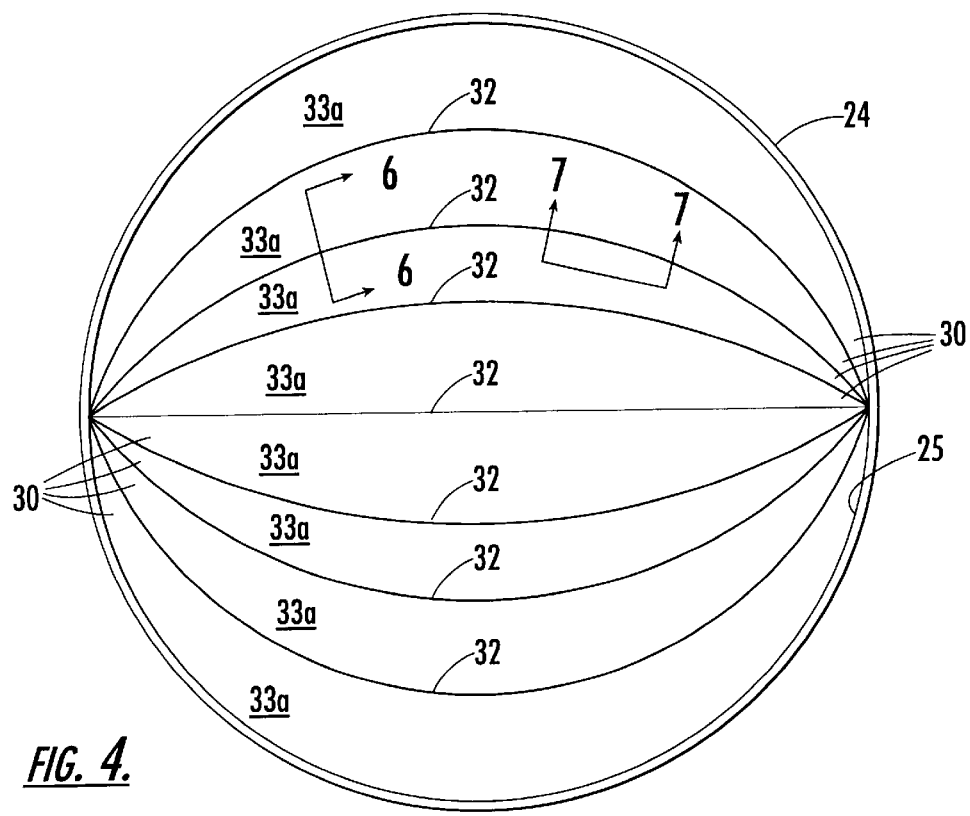
FIG. 4 illustrates a hemispherical projection screen formed from multiple fabric panels joined along peripheral edge portions.

Referring now to FIG. 4, the inner layer 24 is illustrated in greater detail. The inner layer 24 has a hemispherical shape formed from a plurality of fabric sections or panels 30, each panel having arcuate peripheral edge portions. The use of multiple panels with arcuate edge portions allows the inner layer 24 to be pulled taut into a concave shape without wrinkles that might otherwise result if a single piece of material was used. In addition, the use of multiple panels of fabric with limited deformation capabilities (i.e., the fabric does not stretch much in either direction of the weave) provides the ability to have a single speed, unmonitored fan for providing vacuum.

In the illustrated embodiment, the panel peripheral edge portions 32 terminate at respective free ends 31. Adjacent panels 30 are joined along overlapping peripheral edge portions 32 to produce the desired concave shape. In the illustrated embodiment, the fabric panels 30 are oriented such that the peripheral edge portions 32 of each section 30 extend in a generally horizontal direction. However, it is to be understood that other orientations may be utilized without departing from the spirit or intent of the present invention. Furthermore, the inner layer 24 may be formed from fabric panels having various shapes and sizes. Projection screens incorporating aspects of the present invention are not limited to the illustrated shape of the fabric panels 30.

Figure 5:
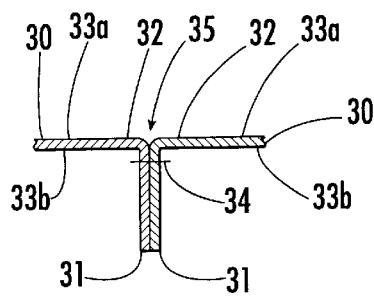
FIG. 5 is a cross-sectional view of joined overlapping peripheral edge portions of adjacent fabric panels.

Referring now to FIG. 5, details of the seam formed by joining the peripheral edge portions 32 of adjacent fabric panels 30 together are illustrated. Each fabric section 30 has a pair of opposite front and rear faces 33a and 33b, respectively. The front faces 33a of adjacent fabric panels 30 are placed in adjacent relationship by overlapping respective peripheral edge portions 32 as illustrated. The overlapping peripheral edge portions are sewn together using stitching 34 of a suitable strength and color to create a seam 35 between joined fabric panels. The seams 35 between adjacent fabric panels 30 are typically visible when viewing the projection surface 25 of the inner layer 24. Prior to the present invention, the seams between adjacent fabric panels were also visible to a viewer when images were projected onto the projection screen 25.

Preferably, the stitching 34 is a nylon material and is white in color to match the color of the projection screen fabric. However, various types of stitching may be used to join adjacent fabric panels, as would be known to those skilled in the art. Preferably, the peripheral edge portions 32 of adjacent fabric panels 30 are sewn together so as to reduce the amount of material left between the stitching 34 and the free ends 31, thereby reducing the amount of material unusable as a screen surface. Typically adjacent fabric panels 30 are sewn together between about one eighth of an inch and about three inches (0.125"–3") from the free end 33 of each fabric panel 30. The present invention is not limited to having adjacent fabric panels sewn together. Adjacent fabric panels 30 may be joined together along peripheral edge portions by a variety of methods including, but not limited to sonic welding, heat welding, adhesive bonding, and the like.

Figure 6:
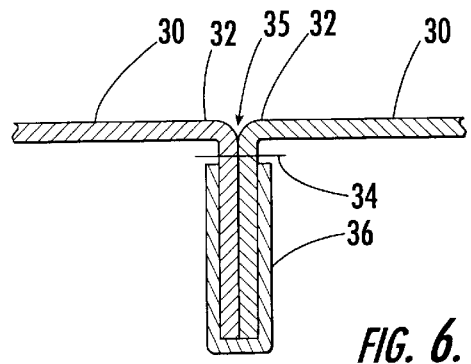
FIG. 6 is a cross sectional view of joined overlapping peripheral edge portions taken along lines 6—6 in FIG. 4 and illustrating covering the overlapping peripheral edge portions with a material having reduced reflectivity.
Figure 7:
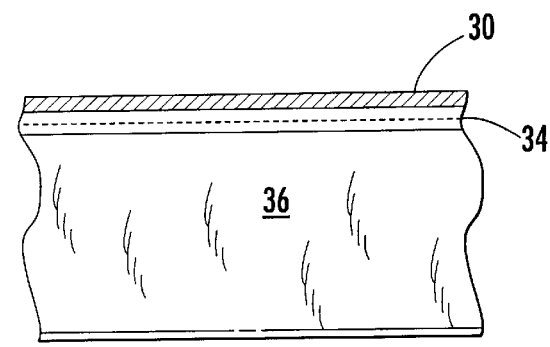
FIG. 7 is a view of joined overlapping peripheral edge portions taken along lines 6—6 in FIG. 4.

Referring now to FIGS. 6 and 7, a strip of substantially non-reflective material 36 overlies the overlapping peripheral edge portions 32 of adjacent fabric panels 30. In the illustrated embodiment, the non-reflective material 36 extends approximately from the stitching 34 exposed on one peripheral edge portion to the exposed stitching on the adjacent edge portion. Although it is preferable that the non-reflective material 36 cover the entire overlapping edge portions 32 of adjacent fabric panels, it is not required.

The purpose of the substantially non-reflective material 36 is to reduce the reflection of light from the overlapping edge portions 32 of joined fabric panels 30 when images are projected onto the projection surface 25 of the inner layer 24. The reflection of light from these overlapping edge portions 32 behind the projection surface 25 of the inner layer 24 may cause a seam to be visible when images are projected onto the projection surface. Applicants have discovered that placing a substantially non-reflective material over these peripheral edge portions reduces the amount of light reflected therefrom and diminishes or eliminates the visibility of the seams between adjacent fabric panels when images are projected onto the projection surface 25.

Preferably, the substantially non-reflective material 36 is substantially less reflective than the projection surface 25 of the inner layer 24. An exemplary non-reflective material is tape, such as masking tape, duct tape, and fabric tape, having a dark color, with black being a preferred color. However, various types of materials and dark colors may be utilized as long as the material is substantially less reflective than the projection surface 25. Dark material may be secured to the peripheral edge portions by various other methods, including, but not limited to, pinning, stapling, heat fusing, and gluing.

According to other aspects of the present invention, the overlapping edge portions 32 may be configured to be substantially less reflective than the projection surface 25 by having a darker color than the projection surface 25. Each fabric panel 30 may have its edge portions printed with a dark color, either before joining the panels together, or after. The dark color may be applied mechanically or by hand using a variety of techniques known to those skilled in the art of coloring fabric. Alternative methods of rendering the fabric panel peripheral edge portions substantially less reflective than the projections surface include blackening the edge portions by charring or burning, or by using various photosensitive ink processing techniques. Furthermore, a marking pen or paint brush may be used to apply a dark ink or paint to the peripheral edge portions.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A projection screen, comprising:

a plurality of translucent fabric panels joined along overlapping peripheral edge portions thereof to produce a reflective front surface having visible seams between adjacent fabric panels and an opposite back surface;

wherein said reflective front surface has a first color;

wherein said overlapping peripheral edge portions extend outwardly from the back surface of said projection screen; and wherein said overlapping peripheral edge portions have a second color darker than said first color of the reflective front surface such that said peripheral edge portions have a reflectivity less than a reflectivity of said reflective front surface when an image is projected directly on said reflective front surface between adjacent fabric panels, and such that visibility of the seams between adjacent fabric panels is reduced.

2. A projection screen according to claim 1 wherein said reflective front surface has a concave shape.

3. A projection screen according to claim 1 wherein said reflective front surface has a hemispherical shape.

4. A projection screen according to claim 1 wherein said fabric panels are formed of nylon.

5. A projection screen comprising:

a frame having an annular base and a plurality of arcuate ribs extending therefrom and converging at a location above said annular base;

an outer fabric layer;

an inner fabric layer removably secured to said outer fabric layer adjacent said annular base to form an envelope enclosing said frame;

means for creating a vacuum within said envelope to draw said inner fabric layer taut with said frame to provide a concave viewing surface;

said inner fabric layer comprising a plurality of translucent fabric panels joined along overlapping peripheral edge portions thereof to produce a reflective front surface having visible seams between adjacent fabric panels and an opposite back surface;

wherein said reflective front surface has a first color;

wherein said overlapping peripheral edge portions extend outwardly from the back surface of said projection screen; and wherein said overlapping peripheral edge portions have a second color darker than said first color of said reflective front surface such that said peripheral edge portions have a reflectivity less than a reflectivity of said reflective front surface when an image is projected directly on said reflective front surface between adjacent fabric panels, and such that visibility of the seams between adjacent fabric panels is reduced.

6. A projection screen according to claim 5 wherein said means for creating a vacuum within said envelope comprises a fan.

7. A projection screen according to claim 5 wherein said fabric panels are formed of nylon.

8. A projection screen according to claim 5 wherein said frame is supported within a dome structure.

9. A projection screen according to claim 5 including an optical projection system for projecting images on said reflective front surface.

10. A method of fabricating a projection screen comprising joining a plurality of translucent fabric panels along adjacent overlapping peripheral edge portions to produce a reflective front surface having a first color and an opposite back surface, wherein the overlapping peripheral edge portions extend outwardly from the back surface of the projection screen and have a second color darker than said first color of the reflective front surface.

11. A method according to claim 10 wherein the fabric panels are joined to produce a reflective front surface having a concave shape.

12. A method according to claim 10 wherein the fabric panels are formed of nylon.

13. A method according to claim 10 wherein the plurality of fabric panels are joined along overlapping peripheral edge portions by stitching.

* * * * *